(12) United States Patent
Spain et al.

(10) Patent No.: US 7,411,915 B1
(45) Date of Patent: Aug. 12, 2008

(54) AUTOMATICALLY CONFIGURING SWITCH PORTS WITH APPROPRIATE FEATURES

(75) Inventors: Christopher Spain, Morgan Hill, CA (US); Pauline Shuen, Palo Alto, CA (US); Shashi Kumar, San Jose, CA (US); Glen Robert Fisher, Mountain View, CA (US); Ujjal Bajaj, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 733 days.

(21) Appl. No.: 10/896,410

(22) Filed: Jul. 21, 2004

(51) Int. Cl.
*G01R 31/08* (2006.01)
*H04L 12/28* (2006.01)

(52) U.S. Cl. .................... 370/250; 370/254
(58) Field of Classification Search ............ 370/254, 370/241.1, 244, 247, 248, 252, 253, 255, 370/256, 257, 258; 709/223, 220, 221, 222
See application file for complete search history.

(56) References Cited

U.S. PATENT DOCUMENTS

| | | | | |
|---|---|---|---|---|
| 5,574,722 A | * | 11/1996 | Slykhouse et al. | 370/257 |
| 5,819,042 A | * | 10/1998 | Hansen | 709/222 |
| 5,832,503 A | * | 11/1998 | Malik et al. | 709/223 |
| 6,587,874 B1 | * | 7/2003 | Golla et al. | 709/220 |
| 6,665,713 B1 | * | 12/2003 | Hada et al. | 709/220 |
| 6,772,204 B1 | * | 8/2004 | Hansen | 709/220 |
| 6,810,040 B1 | * | 10/2004 | Lee et al. | 370/397 |
| 7,002,907 B1 | * | 2/2006 | Chen et al. | 370/222 |
| 7,054,924 B1 | * | 5/2006 | Harvey et al. | 709/220 |
| 7,120,139 B1 | * | 10/2006 | Kung et al. | 370/352 |
| 7,249,170 B2 | * | 7/2007 | Tindal et al. | 709/223 |

OTHER PUBLICATIONS

Montague, Jim, "Ethernet Hits Real-Time . . . Really," Control Engineering, Dec. 1, 2003, copyright 2004 Reed Business Information, a division of Reed Elsevier Inc.; retrieved from the Internet: <URL:http://www.manufacturing.net/ctl/iindex. asp?dlayout=articlePrint&articleID=CA339683>.

Mohl, Dirk S., "IEEE 1588: Running Real-Time on Ethernet," retrieved from the Internet: <URL:http://ethernet.industrial-networking.com/articles/i17 real-time.asp>.

* cited by examiner

*Primary Examiner*—Kwang B. Yao
*Assistant Examiner*—Candal Elpenord
(74) *Attorney, Agent, or Firm*—Charles E. Krueger

(57) ABSTRACT

A method and apparatus for automatically configuring a physical port of a switch with features appropriate to a connection type snoops incoming packets to determine the connection type and executes a port configuration macro installed on the switch to apply appropriate features for the connection type.

10 Claims, 5 Drawing Sheets

1: Standard Desktop
2: IP Phone + Standard Desktop
3: Access Point
4: Inter-Switch Trunk
5: Connection to Server
6: Uplink to Router

AUTOMATICALLY CONFIGURING SWITCH PORTS WITH APPROPRIATE FEATURES

BACKGROUND OF THE INVENTION

Modern switches and other internet infrastructure components, such as routers and bridges, are sophisticated devices that offer many features relating to security, quality of service, availability and other factors. A physical port of a switch must be configured to implement a selected set of features based on the connection type. However, the richness of the feature set and other options offered on sophisticated switches and other network infrastructure devices can overwhelm network management personnel who are not highly trained. Thus, in many cases the ports are not configured to take full advantage of the features and options provided by the manufacturer of the switch.

For example, recently, interest in using Ethernet in factory automation has grown due the inclusion of inexpensive Ethernet Network Interface Cards (NICs) on most personal computers and the low costs of commercial-off-the shelf components due to commoditization of Ethernet.

However, it is often the case that sophisticated network personnel are not available to configure ports when new devices are connected to a port resulting in less that optimal utilization of the features and options available on the switch.

BRIEF SUMMARY OF THE INVENTION

In one embodiment of the invention, it is recognized that only a few types of connections are needed to build a network. Templates or Macros of configuration commands are provided that configure the set of features needed for each connection type.

In another embodiment of the invention, macros for configuring ports for different connection types makes configuration best practices available with pretested templates of switch port configurations.

In another embodiment of the invention, the role played by a switch in a structured hierarchical network is broken down to for a particular product to the port level. The appropriate configuration template is provided to configure the port with the set of features needed for the particular device to function in its designated role in the network structure.

In another embodiment of the invention, a particular predefined template can be modified by network personnel.

In one embodiment of the invention, a group of port configuration macros are provided on a switching platform. Each port configuration macro is associated with a connection type and each port configuration macro configures a port with features appropriate for the associated connection type.

In another embodiment of the invention, when a device is connected to a physical port packets from the device are snooped to determine the connection type and the port configuration macro associated with the determined connection type is selected and executed to automatically configure the port with the appropriate features.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. As described above, the use of Ethernet in industrial applications requires that devices on the network be protected from non-malicious security breaches such as infection by viruses and worms that could cause broadcast storms and other damaging events.

Figure 1:
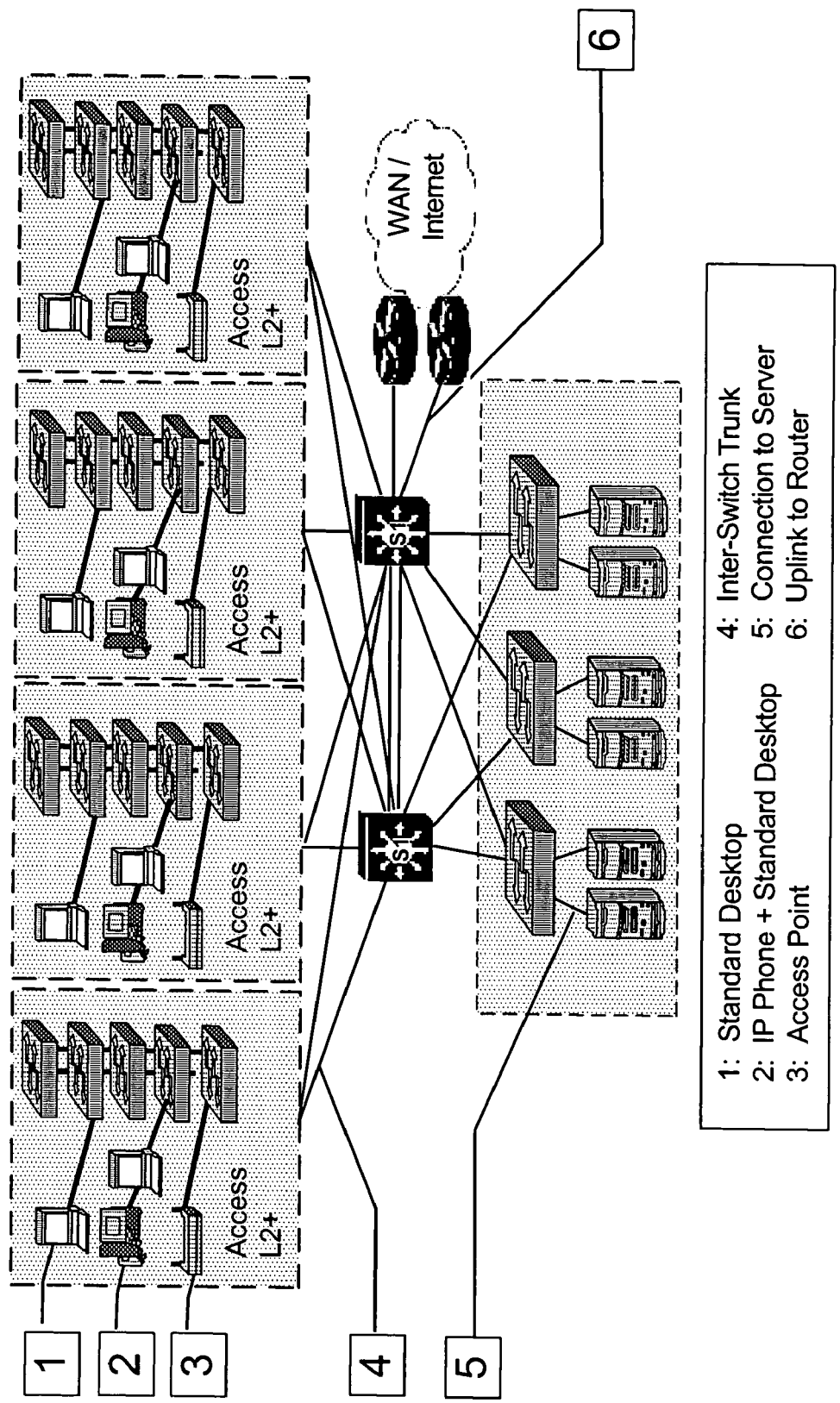
FIG. 1 is a diagram hierarchical network structure.

FIG. 1 depicts a hierarchical network architecture that provides the environment for one embodiment of the invention. As is known in the art, a hierarchical network design distributes networking function through a layered organization.

In the small to medium sized enterprise network designs in FIG. 1, there are two primary layers:

The access layer, through which end devices such as desktops, phones, and wireless access points connect to the network.

The aggregation layer, which aggregates the Access Layer switches. In this design, the aggregation layer also handles the function of a core layer, which is often separate in larger networks.

In the present embodiment auto-configuration templates or "macros" of CLI (command line interface) commands are provided with a switch to break a role in the hierarchical network of FIG. 1 (e.g., the role of access switch or aggregation) down to the port level. In the following the terms "template" and "macro" will be used interchangeably to indicate a defined set of commands for assigning a set of features and options to a port. Thus, the template applied to a switch will depend on the role the switch plays in the hierarchical network and the type of device connected to a particular port.

The invention will now be described with reference to various embodiments implemented in a switching platform (switch). In the following, the term switch is utilized broadly to include any component such a router, bridge, switch, layer 2 or layer 3 switch, gateway, etc., that refers to components utilized to implement connectivity within a network or between networks. In the following, embodiments will be described, by way of example, not limitation, that operate on switches designed and manufactured by the assignee of the present patent application. However, it is understood by persons of skill in the art that the invention has broad utility in any switching platform.

An example of auto-configuration templates or macros for a switch having the role of an access switch in a campus environment will now be described. The templates include global commands that configure the switch according to its role in the network hierarchy and specific interface commands to configure the ports according to connection type.

In a first embodiment, there are default auto-configuration macros for the four standard roles (the macro names are in parenthesis):

Ports connected to Standard Desktop (desktop)
Ports connected to Standard Desktop and IP phone (phone)
Ports connected to Switches (switch)
Ports connected to Routers (router)

The "Standard Desktop" auto-configuration template should be configured when a desktop device, such as a PC, is attached to a switch port. This auto-configuration template helps create a secure and resilient network connection by including commands that do the following:

Configure Error Recovery for Link Flap—Instructs the switch to automatically attempt to recover when an interface is shut down due to Link Flap. This eliminates the need to manually enter a port shutdown command on an affected interface. The template is set to wait 60 seconds before the switch attempts to recover the interface.

Configure as an Access Port—Optimizes the port to operate as an access interface and disables trunking protocols, such as Dynamic Trunking Protocol (DTP) and Port Aggregation Protocol (PAgP).

Configure Port to 'Not Trust' End Device—Prevents users from consuming excessive bandwidth by reconfiguring their PCs.

Enable Port Security and Limit to One MAC Address (default)—Prevents more than one user from attaching to the same port at one time. For example, if a hub is attached to the port, this configuration will prevent additional users from accessing the network.

Enable PortFast—Allows for quicker link recovery than is possible with the standard Spanning Tree Protocol.

Enable BPDU (Bridge Protocol Data Unit) Guard—Protects the network by disabling ports if an unauthorized, Spanning Tree enabled switch is connected to an edge port.

Configure Data VLAN—Creates a unique data VLAN which isolates user data traffic from the management traffic on the management VLAN.

The "IP Phone plus Standard Desktop" auto-configuration template should be configured when a PC and an IP Phone are attached to a port. This template is an extension of the Standard Desktop template, and provides the same security and resiliency features, but with the addition of dedicated voice VLANs to ensure proper treatment of delay-sensitive voice traffic. This template helps create a secure and resilient network connection by including commands that do the following:

Configure Error Recovery for Link Flap—Instructs the switch to automatically attempt to recover when an interface is shut down due to Link Flap. This eliminates the need to manually enter a port shutdown command on an affected interface. This template is set to wait 60 seconds before the switch attempts to recover the interface.

Configure the Port as an Access Port—Optimizes the port to work as an access interface and disables trunking protocols, such as Dynamic Trunking Protocol (DTP) and Port Aggregation Protocol (PAgP).

Enable Port Security and Limit to Three MAC Addresses—Prevents more than one desktop and one phone from attaching to the same port at one time. For example, if a hub is attached to the phone, this configuration will prevent additional users from accessing the network.

Set Port Security Inactivity Timers—Resets learned secure MAC addresses after being disconnected for two minutes.

Enable PortFast—Allows for quicker link recovery than with standard Spanning Tree.

Enable BPDU Guard—Protects the network by disabling ports if an unauthorized, Spanning Tree enabled switch is connected to an edge port.

Configure Data VLAN—Creates a unique data VLAN which isolates user data traffic from the management traffic on the management VLAN.

The "Switch" auto-configuration template is used for connecting one switch to another, most commonly from the access layer to the distribution layer. This template leverages the switch feature-rich software to do the following:

Configure Error Recovery for Link Flap—Instructs the switch to automatically attempt to recover when an interface is shut down due to Link Flap. This eliminates the need to manually enter a port shutdown command on an affected interface. This template is set to wait 60 seconds before the switch attempts to recover the interface Set the Encapsulation Format on the Trunk Port to 802.1Q—Enables support for simultaneous tagged and untagged traffic on a port.

Optimize the Port for Fast Convergence—Optimizes the link for high availability by hard coding the link as a trunk and configuring point-to-point Spanning Tree.

Enable AutoQoS—Prioritizes delay-sensitive traffic and ensures consistent treatment of traffic in a Cisco AutoQoS network.

Configure VLANs—Sets VLAN information to be passed to other switches.

Enable PVST+ (Per VLAN Rapid Spanning Tree)—Helps to ensure a loop-free path through the network by enabling PVST+, which is the default spanning-tree mode used on all Ethernet, Fast Ethernet, and Gigabit Ethernet port-based VLANs. PVST+ runs on each VLAN on the switch up to the maximum supported Configure Aggressive Unidirectional Link Detection (UDLD)—Allows precautionary disabling of port on bidirectional links.

The "Router" auto-configuration template is designed to configure the Ethernet link between a switch and a router running IOS. Routers that support 10/100 Ethernet interfaces autonegotiate speed and duplex settings by default. This template hard codes the speed and duplex settings of the switch. If a switch is connected to a non-negotiating, 10 Mbps Ethernet interface, the speed and duplex settings on the switch are configured with the duplex [full|half] and speed [10] commands.

This template does the following:

Configure Error Recovery for Link Flap—Instructs the switch to automatically attempt to recover when an interface is shut down due to Link Flap. This eliminates the need to manually enter a port shutdown command on an affected interface. This template is set to wait 60 seconds before the switch attempts to recover the interface.

Set the Encapsulation Format on the Trunk Port to 802.1Q—Enables support for simultaneous tagged and untagged traffic on a port.

Enable AutoQoS—Prioritizes delay-sensitive traffic and ensures consistent treatment of traffic in a Cisco AutoQoS network.

Trust DSCP—Enables the switch to trust incoming DSCP from the router (which marks traffic using Layer 3 DSCP) to ensure proper treatment of the traffic.

Enable Port Fast—Allows for quicker link recovery than is possible with standard the Spanning Tree Protocol.

Enable BPDU Guard—Protects the network by disabling ports if an unauthorized, Spanning-Tree enabled switch is connected to an edge port.

Configure VLANs—Sets VLAN information to be passed to router.

Enable PVST+—Helps to ensure a loop-free path through the network by enabling PVST+, which is the default spanning-tree mode used on all Ethernet, Fast Ethernet, and Gigabit Ethernet port-based VLANs. PVST+ runs on each VLAN on the switch up to the maximum supported The above auto-configuration templates are described by way of example not limitation. As is known in the art, the details of specific templates will depend on the manufacturer and model of a switch and the particular network architecture utilized.

Figure 2:
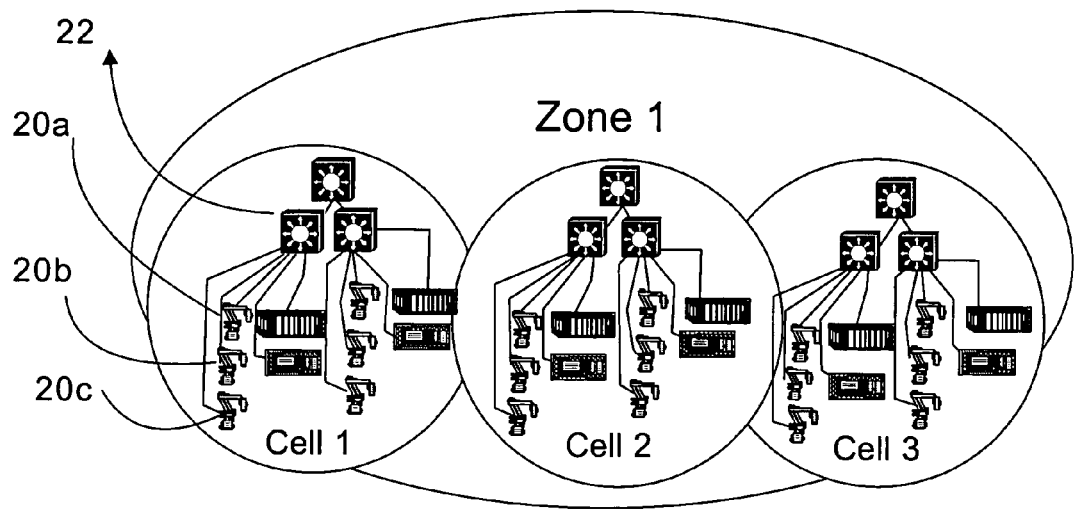
FIG. 2 is a diagram of a manufacturing floor workgroup coupled by Ethernet switches.

A second embodiment of the invention will now be described with reference to a network as depicted in FIG. 2, which depicts an example of how a factory automation network might be set up. An assembly line may contain 20-30 robotic welders 20 grouped into work groups. It may be decided that since the control equipment needs to talk to all the welders, all welders and control equipment would be assigned to the same VLAN (Virtual Local Area Network). However, in some cases where the welders may need to be managed into subgroups (i.e. frame, door panel, hood and trunk), each of these subgroups is assigned its own VLAN. The LAN utilized in the following embodiments is an Ethernet Network described in IEEE 802.3 which is hereby incorporated by reference.

In this example, three robotic welders 20a, b, and c are coupled to a first switch 22 to form a work group. The work group can also be part of a larger network.

A typical switch configuration includes a chassis, which contains basic components such as power supply, fans, slots, ports and modules that slide into the slots. The modules inserted into the slots are line cards which are the actual printed circuit boards that handle packet ingress and egress. Line cards provide one or more interfaces over which traffic flows. Thus, depending on the number of slots and interfaces, a switch can be configured to work with a variety of networking protocols. Some switches are fixed configuration switches that do not use line cards to implement interfaces.

Figure 3:
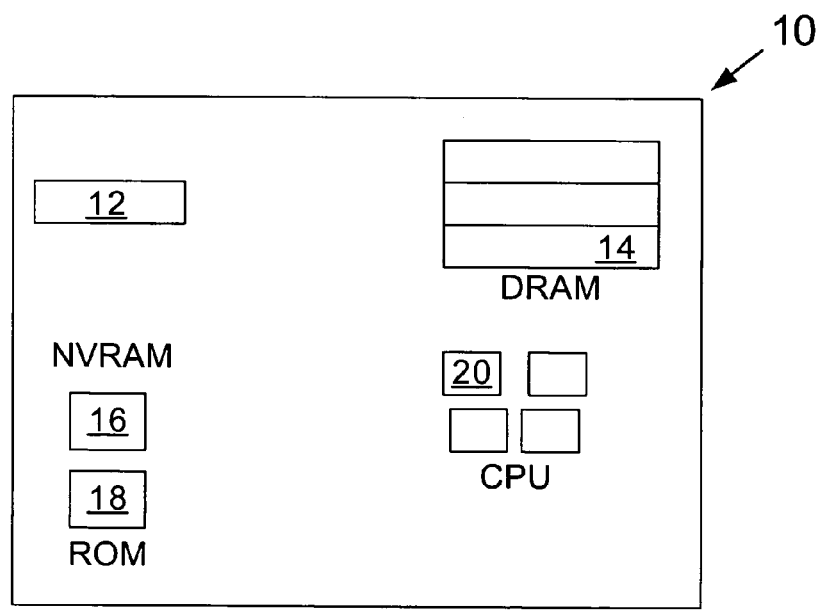
FIG. 3 is a block diagram of the motherboard of a switch.

FIG. 3 depicts an example of a switch including a motherboard 10 having shared DRAM 12, DRAM 14, NVRAM 16, ROM 18 and a CPU 20. (Other components on the motherboard not relevant to the present description are not depicted). The DRAM 14 is the working storage utilized by the CPU and the shared DRAM 12 is dedicated to handling the switch's packet buffer. The NVRAM (non-volatile RAM) is used to store the switch's configuration file and also includes flash memory for storing an image of the IOS® (Internetworking Operating System). The ROM 18 holds a boot-start program which holds a minimum configuration state needed to start the switch. Alternatively, other configurations of the motherboard can be used. For example, the motherboard may not have separate ROM or NVRAM and the configuration file and IOS® image may be stored and executed out of flash memory.

As described above, switches, such as those manufactured by the assignee of the present application, generally provide a rich feature set relating to security, quality of service (QoS), and availability. However, generally only trained network administrator's have the knowledge to fully take advantage of these features and to optimally configure the feature set for the physical ports of a switch.

In one embodiment, auto-configuration macros are utilized that offer a set of verified feature templates per connection type in an easy to apply manner. As described above, with these macros, users can consistently and reliably configure essential security, availability, Quality of Service (QoS) and manageability features with minimal effort and expertise. Auto-configuration macros simplify the configuration of critical features for Ethernet networks.

The present embodiment will be described by way of example, not limitation, in the environment of the factory automation network of FIG. 2 which utilizes switched Ethernet on the manufacturing floor. Other environments will be described below.

As described above, devices networked on the manufacturing floor tend to utilize a limited number of specialized protocols such as the Common Industrial Protocol (CIP). As is known in the art, upper layer applications that use TCP (Transmission Control Protocol) or UDP (User Datagram Protocol) are identified by a TCP/UDPport number. Packets transmitted utilizing TCP or UDP include a source and destination TCP/UDPport numbers.

Each packet received at a physical port of the switch includes TCP/UDPport numbers identifying the protocol used by the device connected to the physical port. For example, the TCP/UDPport number for CIP for transmission by either TCP or UDP is 0xAF12 and this TCP/UDPport number is included in each packet transmitted by a connected device.

In this embodiment, a the switch includes packet snooping software that responds automatically to identify packets transmitted by one of the few well known protocols used by Manufacturing devices running on Ethernet. The switch can automatically learn of the presence by identifying traffic of these well known protocol types. For example, in this embodiment the TCP/UDPport number included in the source field transmitted packets is used to identify the protocol type. As a result, the appropriate configuration relating to security, QoS, and/or other features is automatically applied.

The operation of this embodiment will now be described with reference to the flow chart of FIG. 4. In this embodiment the process of selecting a correct macro is automated by extending the capability of the switch to automatically learn the type of connections. As a result, configuration can be done without intervention by trained network administrators.

Figure 4:
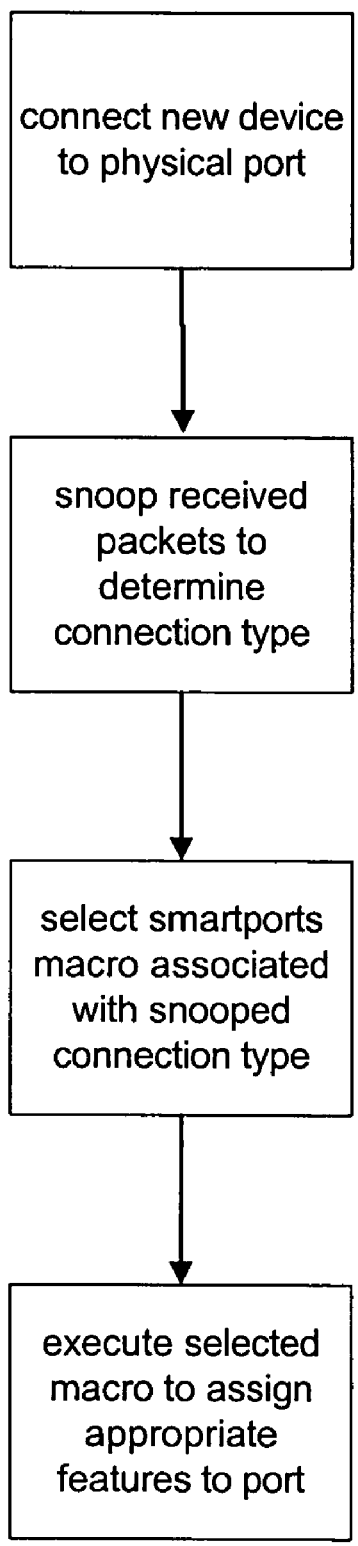
FIG. 4 is a flow chart depicting steps for automatically configuring a physical port.

Referring to FIG. 4, macros will be provided that configure a port to enable critical features required for a device executing a particular protocol. When a factory automation device is connected to a port it will transmit packets having a source ID including the TCP/UDPport number identifying the protocol The switch operating system will include software to examine the TCP/UDPport number and select the correct macro for configuring the port. The auto-configuration macro selected will automatically configure the port to apply the appropriate configuration relating to security and QoS.

This embodiment will now be described in more detail with reference to the flow chart of FIG. 5.

When the switch has no configuration and no IP address there are two ways to set up the configuration of the switch in this embodiment:

In switching platforms manufactured by the assignee of the present application, administrators can use the Express Setup HTML interface residing in the switch to walk through the auto-configuration template questions. Administrators are expected to push the mode button on the front panel of the switch to put the switch into Express Setup mode. Once the switch is in Express Setup mode, it responds to HTTP requests to a specific IP address documented in user manual. The switch also acts as a DHCP server to assign address in the same subnet as the switch's IP address. The administrators can then point a Web browser at the specific IP address and be led through auto-configuration template questions via a HTML interface.

Proprietary factory automation protocols, such as Rockwell's RSLogiX® software, can provide a similar Express Setup HTML interface. In addition, RSLogiX® can provide an offline configuration mode. RSLogiX® can run independently of the switch and support offline switch configuration. As a result, an administrator can run through the auto-configuration template questions without the switch connected or active.

Figure 5:
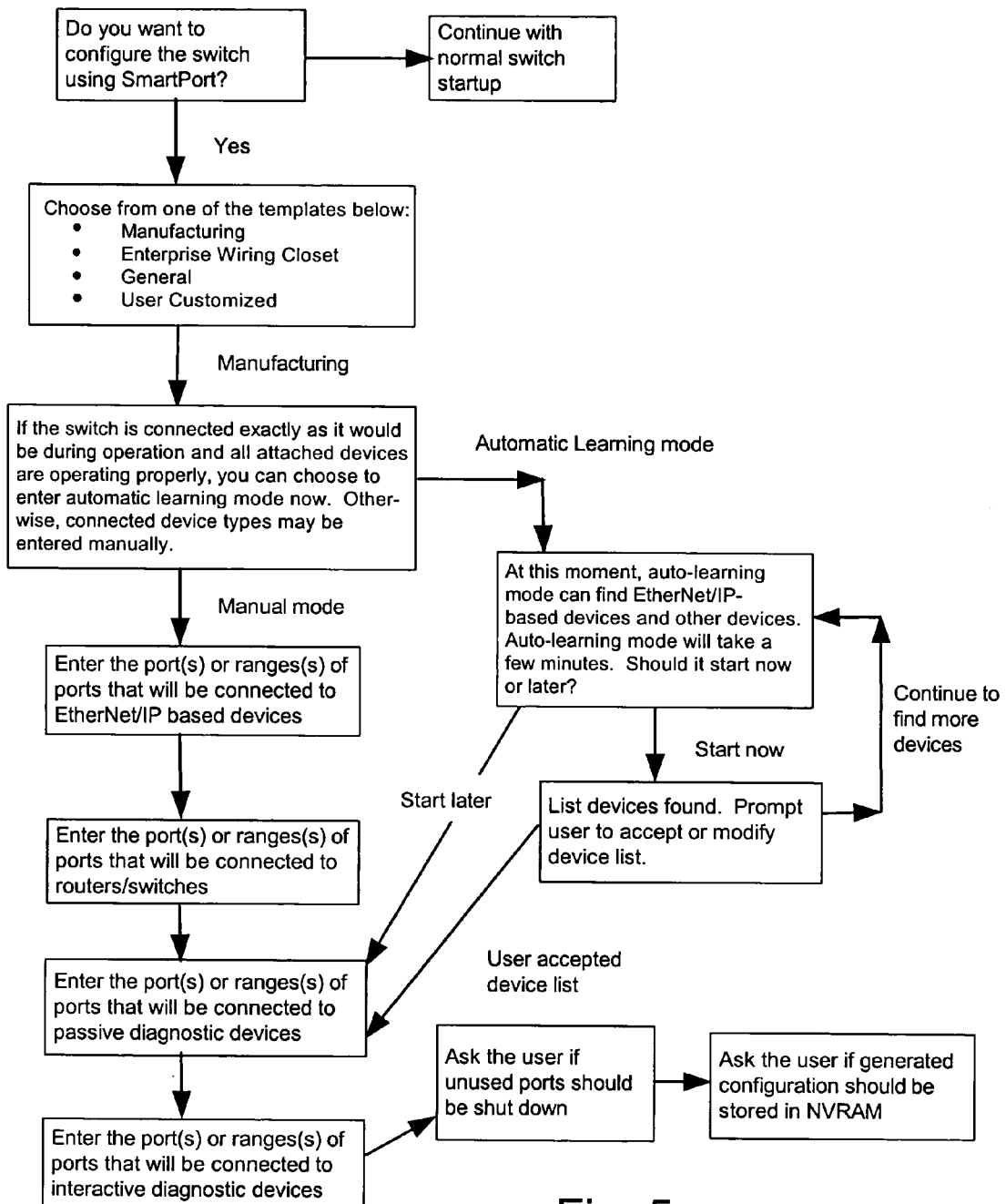
FIG. 5 is a flow chart depicting steps performed by an embodiment of the invention.

Referring to FIG. 5, when a device is connected to physical port, the administrator is asked a short list of simple questions at initial configuration time. One of the questions asks the administrator to choose an auto-configuration template. In the following it is assumed that the Manufacturing template is selected. Based on the answers, the switch automatically applies configuration of the appropriate features.

If administrator chooses to use Auto-learning mode, the switch CPU starts snooping for Ethernet/IP traffic, as described above with reference to FIG. 4, based on the fixed UDP and TCP/UDP port number as mentioned in previous section and also CDP traffic.

Once administrators accept the device list, the rest of the questions will be asked and configuration is generated and enforced immediately. If administrators do not need to verify the auto learning result, then auto-learning mode will be done after the set of questions are completed. When auto learning is complete, configuration will be generated and enforced without verification.

As a result, the following configuration is generated for downlink ports (non uplink ports):

All configuration as specified by the section Layer 4 Access and Rate Control is applied.

Apply Standard desktop template as defined by auto-configuration macros.

As described above, the auto-configuration macro technique can be utilized in a variety of environments such as:

Physical ports facing Desktops,
Desktops and IP Phones,
Inter-Switch connections, and
Switch to Router Uplink connections.

As set forth above, different auto-configuration macros are defined for each of these connection types.

In one embodiment, the user would select the correct auto-configuration macro depending on the connection type. In another embodiment, the device would be recognized when connected to a physical port, the correct auto-configuration macro would be automatically selected and executed to will automatically configure the port to apply the appropriate configuration relating to security and QoS as described above.

In one embodiment, to configure the switch the user connects a workstation to the Ethernet port of the switch and launches the setup page through the browser application on the workstation. For example, the workstation could be the desktop end device connected to the switch in FIG. 1.

Figure 6:
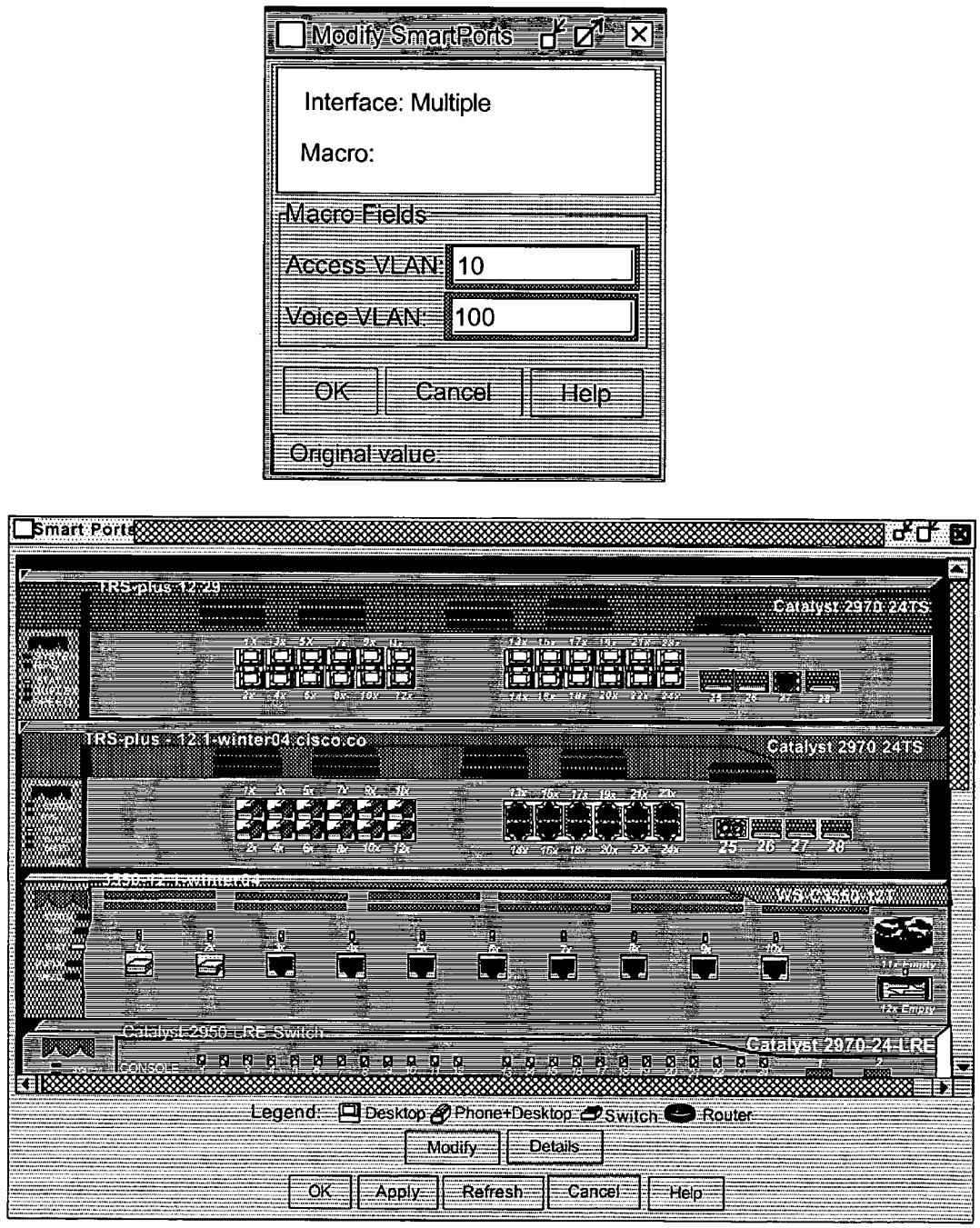
FIG. 6 depicts a user interface for configuring switch ports using templates.

FIG. 6 depicts an example of a user interface for using a the auto-configuration feature. The interface displays a view of the front panel of the switch and a auto-configuration interface selection GUI. The user clicks on the port that is to be configured and then uses the auto-configuration GUI to apply the auto-configuration template for the connection type.

In another embodiment, the user is able to customize the auto-configuration templates and add or delete configuration commands to configure the port to handle custom connection types.

The invention may be implemented as hardware or a combination of hardware and/or program code, stored on a computer readable medium, that is executed by a digital computer. The computer readable medium may include, among other things, magnetic media, optical media, electro-magnetic fields encoding digital information, and so on.

The invention has now been described with reference to the preferred embodiments. Alternatives and substitutions will now be apparent to persons of skill in the art. For example, the above described embodiment has been described implemented in a switch it will be apparent to persons having skill in the art that other network devices, such as a router, bridge, switch, layer 2 or layer 3 switch, gateway, etc., can be utilized to implement the invention. Further, auto-configuration templates for switches performing roles in the network hierarchy not described in detail above can be implemented by persons of skill in the art in apprised of the above disclosure. Accordingly, it is not intended to limit the invention except as provided by the appended claims.

What is claimed is:

1. A method comprising:
   identifying a connection type of a device connected to a port of a switching platform, with the switching platform having a feature set including quality of service, which are available to be applied may be applied to the port on the switching platform using feature assignment commands;
   retrieving a selected port configuration template for an identified connection type, with the selected port configuration template selected from a set of port configuration templates stored on the switching platform, with each port configuration template including a group of pretested feature assignment commands appropriate for an associated network role and an identified connection type;
   and
   applying the feature assignment commands included in the selected port configuration template to the port to automatically configure the port with features appropriate for the network role of the switching platform and the identified connection type.

2. The method of claim 1 where the set of port configuration templates comprises:
   standard desktop and standard desktop with IP phone port configuration templates for use with switching platforms acting as access switching platforms; and
   switch to switch and uplink switch to router port configuration templates for use with switching platforms acting as aggregation switching platforms.

3. The method of claim 1 where identifying a connection type of a device connected to a port of a switching platform comprises the steps of:
   snooping packets from a device connected to the port to determine protocols utilized by the device; and
   automatically applying the port configuration template to the port for the connection type indicated by the protocols used by the connected device.

4. A system comprising:

a memory on a switching platform storing a set of port configuration templates, with each port configuration template including a group of pretested feature assignment commands appropriate for an associated network role and an identified connection type, with the switching platform having a feature set including quality of service, which are available to be applied may be applied to a port on the switching platform using feature assignment commands; and a processor configured to identify a connection type of a device connected to a port of the switching platform, to retrieve a selected port configuration template for the identified connection type, and to apply the feature assignment commands included in the selected port configuration template to the port to automatically configure the port for the network role of the switching platform and the identified connection type.

5. The system of claim 4 with the memory further storing standard desktop and standard desktop with IP phone port configuration templates for use with switching platforms acting as access switching platforms and switch to switch and uplink switch to router port configuration templates for use with switching platforms acting as aggregation switching platforms.

6. The system of claim 4 with the processor configured to:

snoop packets from a device connected to a port to determine protocols utilized by a connected device; and automatically apply the port configuration template to the port for the connection type indicated by the protocols used by the connected device.

7. A system comprising:

means for identifying a connection type of a device connected to a port of a switching platform, with the switching platform having a feature set including quality of service, which are available to be applied may be applied to the port on the switching platform using feature assignment commands;

means for retrieving a selected port configuration template for an identified connection type, with the selected port configuration template selected from a set of port configuration templates stored on the switching platform, with each port configuration template including a group of pretested feature assignment commands appropriate for an associated network role and an identified connection type; and means for applying the feature assignment commands included in the selected port configuration template to the port to automatically configure the port with features appropriate for the network role of the switching platform and the identified connection type.

8. The system of claim 7 where the set of port configuration templates comprises:

standard desktop and standard desktop with IP phone port configuration templates for use with switching platforms acting as access switching platforms; and switch to switch and uplink switch to router port configuration templates for use with switching platforms acting as aggregation switching platforms.

9. The system of claim 7 where the means for identifying further comprises:

means for snooping packets from a device connected to a port to determine protocols utilized by the device;

means for automatically applying the port configuration template to the port for the connection type indicated by the protocols used by the connected device.

10. A method comprising:

processing packets received from a device newly connected to a first physical port of a switching platform to determine the connection type for that device, with the switching platform having a feature set including quality of service, which are available to be applied may be applied to the port on the switching platform using feature assignment commands;

retrieving a selected port configuration macro for a determined connection type, with the selected from a plurality of port configuration macros stored on the switching platform, with each port configuration macro including a group of pretested feature assignment commands appropriate for an associated network role and a determined port connection type; and executing the feature assignment commands included in the selected port configuration macro to automatically configure the first port with a feature set appropriate to the determined connection type.

* * * * *